(12) United States Patent
Chakravarty et al.

(10) Patent No.: US 9,047,145 B2
(45) Date of Patent: *Jun. 2, 2015

(54) EVENT SOURCE MANAGEMENT USING A METADATA-DRIVEN FRAMEWORK

(75) Inventors: Dipto Chakravarty, Potomac, MD (US); Usman Choudhary, Springfield, VA (US); John Paul Gassner, Alexandria, VA (US); Frank Anthony Pellegrino, Greenbelt, MD (US); William Matthew Weiner, Rockledge, FL (US); Yuriy Fuksenko, Rockville, MD (US); Robert Price, Provo, UT (US)

(73) Assignee: NOVELL INTELLECTUAL PROPERTY HOLDINGS, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/159,927

(22) Filed: Jun. 14, 2011

(65) Prior Publication Data

US 2011/0296015 A1 Dec. 1, 2011

Related U.S. Application Data

(62) Division of application No. 11/730,493, filed on Apr. 2, 2007, now Pat. No. 7,984,452.

(60) Provisional application No. 60/865,305, filed on Nov. 10, 2006.

(51) Int. Cl.
*G06F 9/54* (2006.01)
*G06F 11/30* (2006.01)
(Continued)

(52) U.S. Cl.
CPC ............ *G06F 9/542* (2013.01); *G06F 11/3065* (2013.01); *G06F 11/3072* (2013.01); *H04L 41/046* (2013.01); *H04L 41/0613* (2013.01); *H04L 41/0869* (2013.01); *H04L 41/22* (2013.01); *H04L 43/028* (2013.01); *H04L 43/045* (2013.01);
(Continued)

(58) Field of Classification Search
None
See application file for complete search history.

(56) References Cited

U.S. PATENT DOCUMENTS

| 5,630,069 A | 5/1997 | Flores et al. ................ 395/207 |
| 5,657,245 A | 8/1997 | Hecht et al. ................. 364/505 |

(Continued)

OTHER PUBLICATIONS

Mansouri-Samani et al., "GEM A Generalised Event Monitoring Language for Distributed Systems" Jun. 1997, IEE/IOP/BCS Distributed Systems Engineering Journal vol. 4, No. 2.*

(Continued)

*Primary Examiner* — Qing Wu
(74) *Attorney, Agent, or Firm* — Pillsbury Winthrop Shaw Pittman LLP

(57) ABSTRACT

The system and method described herein relates to managing multiple network device connections, collecting event source data from one or more network devices with one or more collectors, filtering the event source data, continuously monitoring the network device connections, controlling raw data collection from the one or more network devices, parsing the event source data into normalized data structures, and managing configurations for the collectors, among other things. Event sources may be physical or logical network devices distributed across a network, including but not limited to, firewalls, routers, biometric devices, mainframes, databases, and applications. The network devices may be sources from which the collectors may receive or request the event source data.

20 Claims, 15 Drawing Sheets

(51) Int. Cl.
*H04L 12/24* (2006.01)
*H04L 12/26* (2006.01)
*H04L 29/08* (2006.01)

(52) U.S. Cl.
CPC .......... *H04L 43/0817* (2013.01); *H04L 43/12* (2013.01); *H04L 67/2823* (2013.01); *H04L 67/2828* (2013.01)

(56) References Cited

U.S. PATENT DOCUMENTS

| | | | |
|---|---|---|---|
| 6,205,407 B1 | 3/2001 | Testa et al. | 702/119 |
| 6,208,720 B1 | 3/2001 | Curtis et al. | 379/114 |
| 6,618,766 B1 | 9/2003 | Eshghi | 709/318 |
| 6,779,120 B1 | 8/2004 | Valente et al. | 713/201 |
| 6,792,456 B1 | 9/2004 | Hellerstein et al. | 709/224 |
| 6,807,583 B2 | 10/2004 | Hrischuk et al. | 709/318 |
| 6,839,850 B1 | 1/2005 | Campbell et al. | 713/201 |
| 6,850,820 B2 | 2/2005 | Tajima | 700/286 |
| 6,865,185 B1 | 3/2005 | Patel et al. | 370/412 |
| 6,886,102 B1 | 4/2005 | Lyle | 713/201 |
| 6,983,221 B2 | 1/2006 | Tracy et al. | 702/181 |
| 7,051,125 B1 | 5/2006 | Flott, Jr. et al. | 710/52 |
| 7,065,493 B1 | 6/2006 | Homsi | 705/8 |
| 7,302,674 B1 | 11/2007 | Gladieux et al. | 717/101 |
| 7,324,108 B2 | 1/2008 | Hild et al. | 345/440 |
| 7,379,999 B1 | 5/2008 | Zhou et al. | 709/224 |
| 7,444,395 B2 | 10/2008 | Sanghvi et al. | 709/223 |
| 7,457,872 B2 | 11/2008 | Aton et al. | 709/224 |
| 7,565,643 B1 | 7/2009 | Sweet et al. | 717/121 |
| 7,624,396 B1 | 11/2009 | Isenberg | 719/314 |
| 7,673,335 B1 | 3/2010 | Chakravarty et al. | 726/11 |
| 7,707,133 B2 | 4/2010 | Das et al. | 706/50 |
| 7,899,935 B2 | 3/2011 | Zhu et al. | 709/246 |
| 7,926,099 B1 | 4/2011 | Chakravarty et al. | 726/13 |
| 7,984,452 B2 | 7/2011 | Chakravarty et al. | 719/318 |
| 8,185,488 B2 | 5/2012 | Chakravarty et al. | 706/47 |
| 2001/0051937 A1 | 12/2001 | Ross et al. | 706/47 |
| 2002/0087220 A1 | 7/2002 | Tveit et al. | 700/22 |
| 2002/0111755 A1 | 8/2002 | Valadarsky et al. | 702/58 |
| 2002/0111824 A1 | 8/2002 | Grainger | 705/1 |
| 2002/0138605 A1* | 9/2002 | Hole | 709/224 |
| 2002/0173997 A1 | 11/2002 | Menard et al. | 705/7 |
| 2003/0135378 A1 | 7/2003 | Carlson et al. | 705/1 |
| 2003/0172166 A1 | 9/2003 | Judge et al. | 709/229 |
| 2004/0010709 A1 | 1/2004 | Baudoin et al. | 713/201 |
| 2004/0015497 A1 | 1/2004 | Swarna et al. | 707/6 |
| 2004/0138970 A1 | 7/2004 | Ramachandran et al. | 705/34 |
| 2004/0139166 A1 | 7/2004 | Collison | 709/207 |
| 2005/0005017 A1 | 1/2005 | Ptacek et al. | 709/229 |
| 2005/0086502 A1 | 4/2005 | Rayes et al. | 713/189 |
| 2005/0160134 A1 | 7/2005 | Childress et al. | 709/200 |
| 2005/0175183 A1 | 8/2005 | Ovadia et al. | 380/278 |
| 2005/0222811 A1 | 10/2005 | Jakobson et al. | 702/183 |
| 2005/0228685 A1 | 10/2005 | Schuster et al. | 705/1 |
| 2005/0262215 A1 | 11/2005 | Kirov et al. | 709/207 |
| 2006/0015603 A1 | 1/2006 | Jakobson et al. | 709/223 |
| 2006/0036713 A1 | 2/2006 | Araujo et al. | 709/220 |
| 2006/0116913 A1 | 6/2006 | Hansan et al. | 705/4 |
| 2006/0130070 A1 | 6/2006 | Graf | 719/318 |
| 2007/0047439 A1 | 3/2007 | An et al. | 370/231 |
| 2007/0180490 A1 | 8/2007 | Renzi et al. | 726/1 |
| 2007/0192853 A1 | 8/2007 | Shraim et al. | 726/22 |
| 2007/0192862 A1 | 8/2007 | Vermeulen et al. | 726/23 |
| 2007/0288253 A1 | 12/2007 | Cobb et al. | 705/1 |
| 2008/0016502 A1 | 1/2008 | Henderson et al. | 717/143 |
| 2008/0047009 A1 | 2/2008 | Overcash et al. | 726/23 |
| 2008/0103857 A1 | 5/2008 | Yankovich et al. | 705/7 |
| 2008/0288330 A1 | 11/2008 | Hildebrand et al. | 705/10 |
| 2009/0265288 A1 | 10/2009 | Chakravarty et al. | 706/11 |
| 2010/0198636 A1 | 8/2010 | Choudhary et al. | 705/7 |
| 2011/0173359 A1 | 7/2011 | Chakravarty et al. | 710/112 |

OTHER PUBLICATIONS

Chen et al., "Complex Event Processing Using Simple Rule-Based Event Correlation Engines for Business Performance Management", Proceedings of the 8$^{th}$ IEEE International Conference on E-Commerce Technology and the 3$^{rd}$ IEEE International Conference on Enterprise Computing, E-Commerce, and E-Services, CEC/EEE 2006, 8 pages.

* cited by examiner

| Health Monitor | | | |
|---|---|---|---|
| Name | Configured Status | Actual Status | Connection Info | Error |
| ⊞ MyProxy1 | On | On | | |
| ☐ MyCollect... | On | On | | |
| MyDevi... | On | On | File connection to C:\fi... | |
| MyDevi... | On | On | File connection to C:\fi... | |
| MyDevi... | Off | Off | File connection to C:\fi... | |

Graphical View | Tabular View

EVENT SOURCE MANAGEMENT USING A METADATA-DRIVEN FRAMEWORK

RELATED APPLICATION DATA

This application is a divisional of U.S. patent application Ser. No. 11/730,493, entitled "Event Source Management Using a Metadata-Driven Framework," filed Apr. 2, 2007, now U.S. Pat. No. 7,984,452, which claims the benefit of U.S. Provisional Patent Application Ser. No. 60/865,305, entitled "Event Source Management Using a Metadata-Driven Framework," filed Nov. 10, 2006, the contents of which are hereby incorporated by reference in their entirety.

FIELD OF INVENTION

The present invention relates to monitoring and managing computer network event sources and particularly to providing network device level visibility for event source management.

BACKGROUND

Currently, computer network management systems require many resources to manage and monitor multiple network device connections. Present managing systems can visualize connections to network devices, however these systems fail to visualize and manage operations at the actual end devices. As such, these systems are limited in their ability to manage and collect event sources at a network device level. Furthermore, current network management systems do not provide any insight into the state of the event source itself, the network device. This prevents the system from taking actions on the network device and can results in a system that is limited to reacting to event data rather than proactively preventing errors, and/or security breaches using the state information from the network device. Current systems also lack, among other things, the ability to normalize event data from disparate event sources for efficient reporting and analysis.

SUMMARY

The present invention overcomes these and other disadvantages. One aspect of the invention relates to managing multiple network device connections and/or collectors for collecting event source data from one or more network devices, filtering event source data, continuously monitoring connection status to the one or more network devices, controlling raw data collection from the one or more network devices, parsing event source data into normalized data structures, and/or managing collector configurations, among other things. Event sources may be network devices (physical or logical) across a network, including but not limited to, firewalls, routers, biometric devices, mainframes, databases and/or applications. A network device may be a source from which a collector may receive and/or request event data.

The present invention provides a flexible collector framework including, among other things, one or more collectors that gather events and information from numerous network devices, systems and applications. The collector framework also provides one or more user interfaces that allow users (e.g., network administrator) to manage, control, and monitor event sources (e.g., network device(s)) and connections to the event sources. Data from the event sources may be collected and normalized in order to more efficiently determine the level of security and compliance to current network standards and/or network governance for corporate (or other) network having disparate devices.

A system and method of the invention provides network device level visibility which allows data from network devices to be monitored, filtered, managed, and/or configured in a proactive manner. Furthermore, for effective management, multiple network devices can be pooled to a single collector.

The collector framework may comprise a plurality of components which a user can deploy, configure, and monitor via one or more user interfaces. The components of the framework system may include a central manager, a central repository, a proxy manager, a collector manager, a collector directory, an event listener, an agent engine, one or more collectors, and/or one or more network devices. One or more of the network devices may be grouped into network device groups. Collectively the one or more components in the collector framework enable the one or more collectors to be deployed in order to perform in-depth monitoring into events and status (state) related to one or more network devices. Status may include operations state information for the device (e.g., normal, errors, unsecured, etc.). Events may include, among other things, security events, compliance events, or network traffic events.

The central manager may function as a control unit. A central repository may be located at or associated with the central manager. Event data and status information may be received and collected at the central repository. The central manager also provides user interface views including a collector configuration interface, a health/status monitoring interface, and/or a central repository interface. Each interface enables a user and/or network administrator to visualize and control respective aspects of the collector framework. For example, the user may configure a collector using the collector configuration interface. The configuration information (e.g., collector scripts, configuration settings, test data, etc.) may then be propagated from the central manager out to a collector manager.

The collector manager may execute several functions including, among other things, connecting to an agent engine, creating a collector process on the agent engine, managing listener ports for event data from the agent engine, processing event data from the agent engine, sending processed event data back to the central repository, and/or sending status of the running collector(s) to a proxy manager. The collector manager may start a collector at the agent engine by downloading the latest version of a collector script from the central repository and/or receiving a collector data object. The downloaded script may be written to the agent engine to begin a collector process. The collector data object may be retained at the collection manager in order to maintain a copy of one or more collector instances.

The proxy manager may execute several functions including, among other things, managing connections to network devices, which are the source of data for a collector, updating collector related configurations, triggering the collector manager to start a port and passing it the related collector data object, and sending status (health) of collector(s) to the central repository. Communications with the proxy manager are carried out in proxy mode.

The agent engine may operate as a security device for event exchange. The agent engine may instantiate a collector based at least in part on data obtained from the proxy manager, collector manager, and/or central manager. The agent engine receives and manages the event data from the collector and sends the event data to the collector manager and/or status information about the collector(s) to the proxy manager.

The collector may be linked to one or more network devices and may include a port configuration module and a collector script. Collectively, the port configuration module and collector script create a collector. Each may be configured independently of each other by the central manager or other entity. A unique port configuration file is written for each collector. A port configuration file contains the configuration information for opening one or more communication ports to respective network devices. The collector may be deployed in order to perform in depth monitoring of the state of the network devices. The collector manager may download the collector scripts from the central repository in order to run a collector. Collector scripts may be device specific. The collector script parses the data from the network devices into a normalized data structure. This allows the system to effectively normalize event data from disparate network devices for easier standardized reporting of event data.

One or more common network devices may be grouped to create a network device group that feeds event data to a single collector. Network devices may include, among other things, firewalls, routers, biometric devices, mainframes, databases and applications. Event data may include security events, compliance events, network events, etc.

The event listener is a socket server on the collector manager that accepts connections from agent engine. The agent engine sends event data to the event listener for processing by the collector manager.

A proxy connector is a component that connects the agent engine to the proxy manager. The proxy connector enables data and messages to be communicated back and forth between the agent engine and the proxy manager during a proxy mode. The proxy connection may be used to communicate status/health information from the collector and devices to the central repository.

According to one embodiment, the collector framework enables a user to access the collector configuration interface to create and/or update a collector from the central manager. Instructions may be propagated out to the collector manager that may in turn be used to create and/or update the collector(s).

According to another embodiment of the invention, the collector framework allows device level status (health) monitoring. A health monitoring interface can give visibility into the operations status of the network device. The collector script associated with each collector may gather status information from the one or more respective network device. The data may be normalized to provide standardized status reporting.

According to another embodiment of the invention, the system provides the ability to test event source connections. This functionality can allow the user to test configuration settings by activating a connection to an event source (e.g., network device) and displaying raw event source data to the user. The system may also enable the user to select a collector or event source and automatically display those events coming from the selected event source (e.g., network device). This functionality may also allow a user to view raw event source data streaming in real-time from the selected event source.

According to yet another embodiment of the invention, event source filters may be configured at the network device level in order to implement data filtering at the network device and before it gets processed by a collector. One advantage to this is that filtering on data may be done earlier in the data stream at the device level.

According to another embodiment of the invention, the collector framework may be easily modified to add event source connections to network devices from a collector. This allows a group of event sources (e.g., network devices) to be collectively configured to use common services for configuration and health reporting via a single collector, without having to re-implement collector services for each event source. One advantage to using such a method enables an efficient way of building connectors into the framework.

Other advantages provided by this system may include the reduced resources required to deploy, manage, and monitor multiple device connections. The collector framework may have greater control over connections it deploys. Other advantages may exist.

BRIEF DESCRIPTION OF DRAWINGS

FIG. 5b illustrates a health monitor user interface using a tabular view, according to one embodiment of the invention.

FIG. 9 illustrates an exemplary window for a collector script viewer, according to one embodiment of the invention.

DETAILED DESCRIPTION

Figure 1:
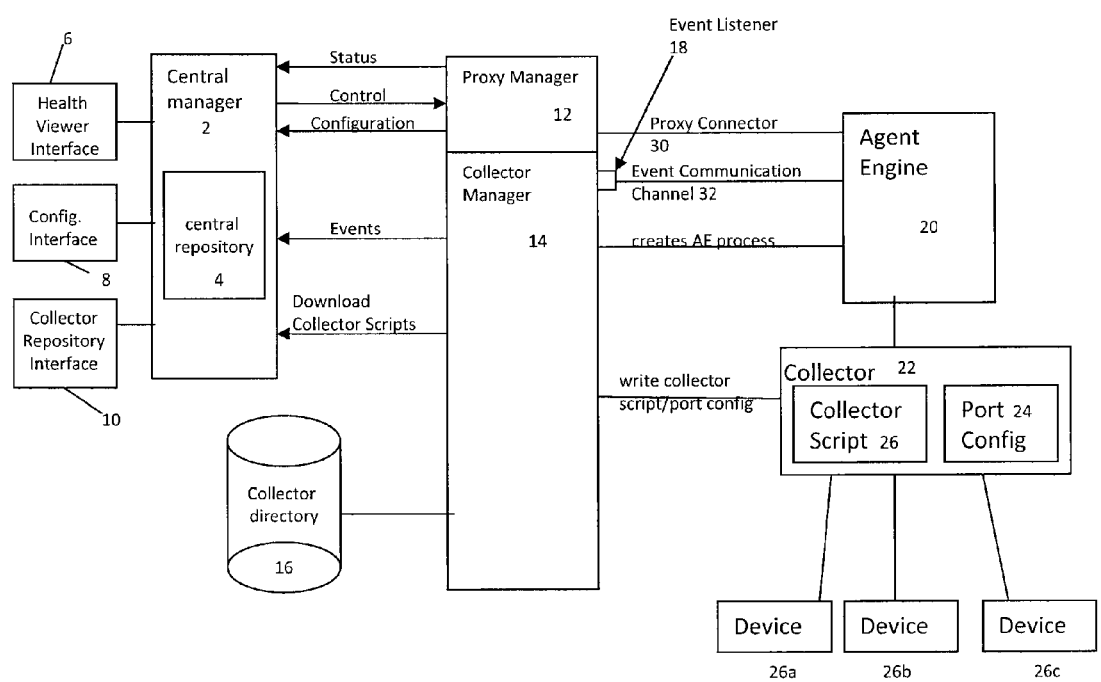
FIG. 1 illustrates a collector framework for implementing event source management, according to an embodiment of the invention.

The present invention relates to a system and method for, among other things, continuously monitoring and collecting status information and event data from one or more network devices on a computer network, parsing event data into normalized data structure, configuring one or more collectors, filtering the event data, normalizing the status information and event data, and displaying the normalized status information and event data to a user (e.g., network administrator).

In one or more embodiments a collector framework system 1 (FIG. 1) may include, a central manager 2, a central repository 4, a proxy manager 12, a collector manager 14, collector directory 16, an event listener 18, an agent engine 20, a collector 22, and/or one or more devices (26a-c). The components may be linked to communicate with each other in order to enable the collection and management of status information and event source data from one or more network devices. One or more of the components may be implemented on the same or separate computer systems.

FIG. 1 illustrates interaction between the central manager 2, collector manager 14 and agent engine 20, among other components of the system. The central manager 2 may function as the control unit for the collector framework system 1. A central repository 4 may be located at or associated with the central manager 2. Event data and status information may be received and collected at the central repository 4. The central manager also provides user interface views including a health/status monitoring interface 6, a collector configuration interface 8, and/or a central repository interface 10. Each interface enables a user and/or network administrator to visualize and control respective aspects of the collector framework system 1. For example, the user may configure a collector 22 using the collector configuration interface 8. The configuration information (e.g., collector scripts, configuration settings, test data, etc.) may then be propagated from the central manager 2 out to a collector manager 14, The collector manager 14 may execute several functions including, among other things, connecting to an agent engine 20, creating a collector process on the agent engine 20, managing listener ports for event data from the agent engine 20, processing event data from the agent engine 20, sending processed event data back to the central repository 4, and/or sending status of the running collector(s) 22 to a proxy manager 12. The collector manager 14 may start a collector 22 at the agent engine 20 by downloading a collector script from the central repository and/or receiving a collector data object. The downloaded script may be written to the agent engine to begin a collector process. For example, a collector 22 may be created based at least on the collector script 22. The collector data object may be retained at the collection manager 14 in order to maintain a copy of one or more collector instances.

The proxy manager 12 may execute several functions including, among other things, creating and managing connections to network devices 26*a-c*, which are the source of data for a collector 22, updating collector related configurations, triggering the collector manager 14 to start a port and passing it the related collector data object, and sending status (health) of collector(s) to the central repository. Communications with the proxy manager 12 are carried out in proxy mode. The agent engine 20 may connect to the proxy manager 12 in order to obtain information regarding which devices the collector should connect to.

The agent engine 20 may operate as a security device for event exchange. The agent engine 20 may instantiate a collector 22 based at least in part on data obtained from the proxy manager 12, collector manager 14, and/or central manager 2. The agent engine 20 receives and manages the event data from the collector 22 and sends the event data to the collector manager 14 and/or status information about the collector(s) to the proxy manager 12.

The collector 22 may be linked to one or more network devices 26*a-c* and may include a port configuration file 24 and a collector script 26. Collectively, the port configuration file 24 and collector script 26 can create a collector 22. Each may be configured independently of each other by the central manager 2 or other entity. A unique port configuration file 24 is written for each collector. A port configuration file 24 specifies locations for a collector script.

The collector 22 may be deployed in order to perform in-depth monitoring of event data and state information from the network devices 26*a-c*. Collector scripts may be device specific. The collector manager 14 may download the appropriate collector script(s) from the central repository 4 in order to run a collector 22 on one or more network devices. The collector script 26 parses the data from the network devices into a normalized data structure. This allows the system to effectively normalize event data from disparate network devices for easier standardized reporting of event data. The flexible collector framework also allows the collectors to be added, deleted, and/or modified to the system. By way of example, collectors gather data from source devices via many connection methods including, but not necessarily limited to Syslog, ODBC, JDBC, OPSEC, SSL, HTTP, and/or HTTPS.

One or more network devices 26*a-c* may be grouped to create a network device group (not shown) that feeds event data to a single collector 22. Network devices may be firewalls, routers, biometric devices, mainframes, databases and applications, among other things. Event data may include security events, compliance events, and network events, etc.

The event listener 18 is a socket server on the collector manager 14 that accepts connections from agent engine 20. The agent engine 20 sends event data to the event listener 18 for processing by the collector manager 14.

A proxy connector 30 is a component that connects the agent engine 20 to the proxy manager 12. The proxy connector 30 enables data and messages to be communicated back and forth between the agent engine 20 and the proxy manager 12 during a proxy mode. The proxy connection 30 may be used to communicate status/health information from the collector 22 and devices 26 to the central repository 4.

The collector framework system 1 provides various components that allow the user to view network device level status and event data using one or more collectors. The system may be using to perform various methods associated with collecting, retrieving, parsing, normalizing, analyzing, and reporting the status and event data.

Figure 2:
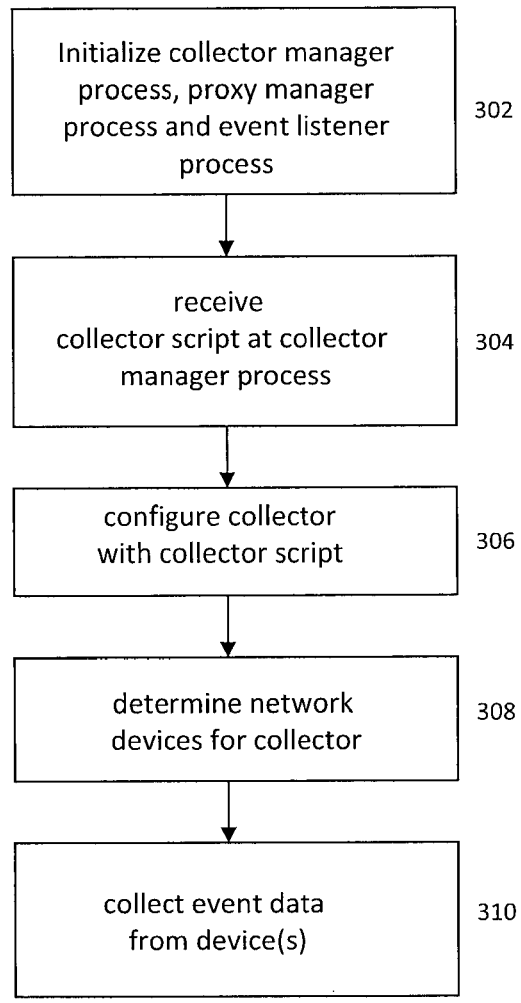
FIG. 2 illustrates a flow diagram for a method associated with the system of FIG. 1, according to one embodiment.

FIG. 2 discloses a flow diagram for a method associated with initializing the collection of event data, according to one embodiment. In operations the system components may be implemented to carry out the method for initializing the collections of event data. A collector manager process (e.g., collector manager 14) may be started, and then a proxy manager process (e.g., proxy manager 12) may be initialized (operations 302). When a proxy manager process starts up for the first time, it may register itself (e.g., with the central repository 4). Registering the proxy manager process may cause a proxy manager data object to be created. The ID of the proxy manager data object may be persistent on the proxy manager machine (e.g., in a file) so that when the proxy manager process is started, it can identify itself to the central manager 2. After registration, the proxy manager process will then be visible via the configuration interface 8 for adding collectors and devices, discussed in further detail below. After the proxy manager process and collector manager process are started the event listening process associated with collector manager 18 may also be initialized (operation 306). The collector manager process, proxy manager process and event listening process may be started and initialized in any order and are not necessarily restricted to the order shown in FIG. 2.

The collector manager process may receive a collector script from a connection to a central managing process in order to start a new collector process (e.g., collector 22) (operation 304). The collector manager process may write the collector script(s) to a collector directory 16, write the port configuration to a file, and spawn an agent engine process, pointing the agent engine process to read the port configuration which points to the location of the collector script in the directory (operation 306).

The agent engine process may use a connection to the registered proxy manager process in order to determine which network devices to connect the newly instantiated collector process to in operation 308. For example, since collector scripts may be device type specific, the proxy manager process can identify the network devices which may be connected to the new collector process. As such, multiple devices may be configured for a single collector to form a device group.

As the agent engine process receives event data from the collector(s) (and network devices) it sends the events through an event communication channel to the collector manager process (operation 310). The collector manager process can perform processing on the received events (e.g., analysis, reporting, etc.) and eventually send the event data to the central repository 4.

Figure 3:
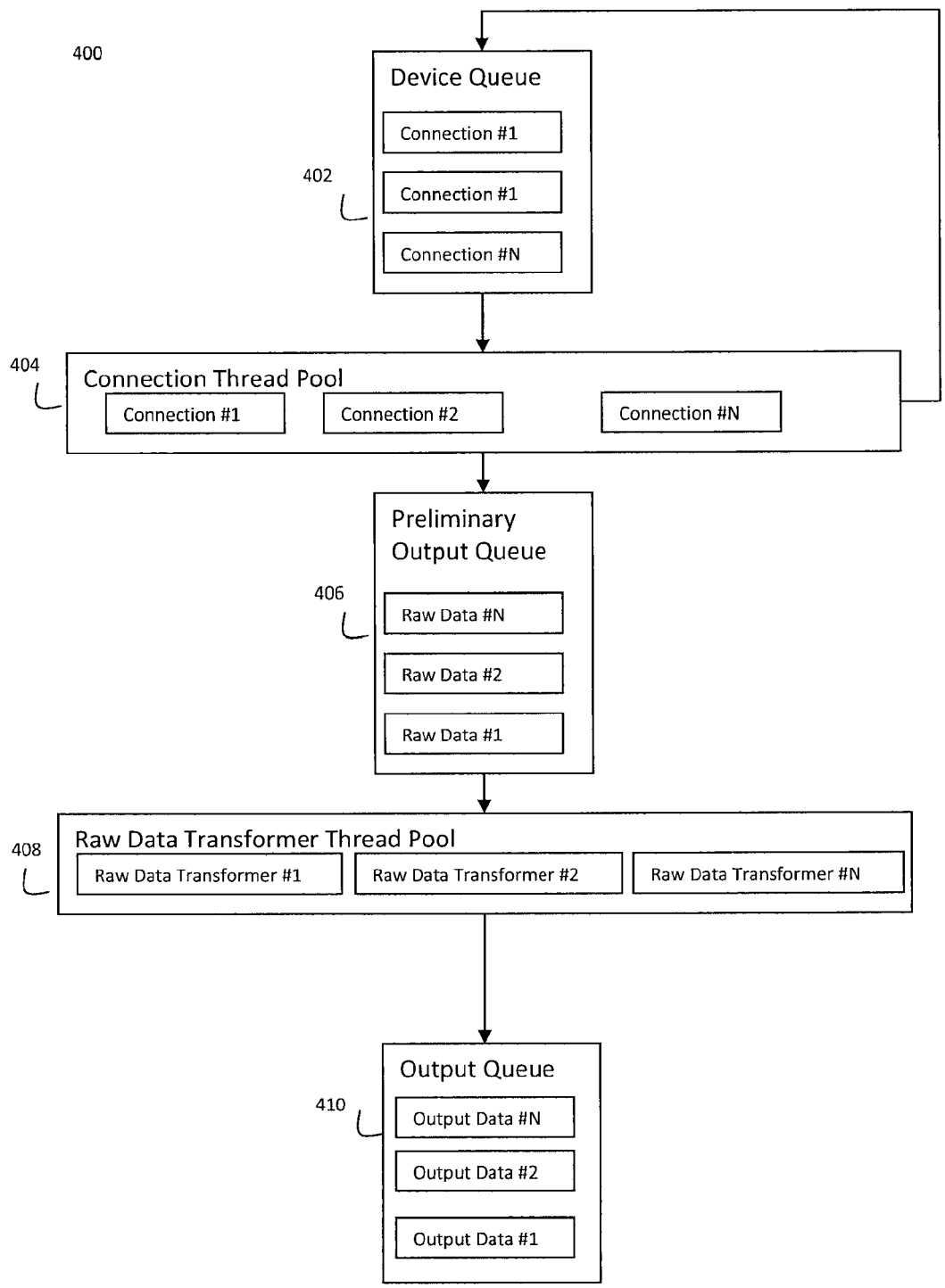
FIG. 3 illustrates a flow diagram for actively collecting data from sources, according to an embodiment of the invention.
Figure 4:
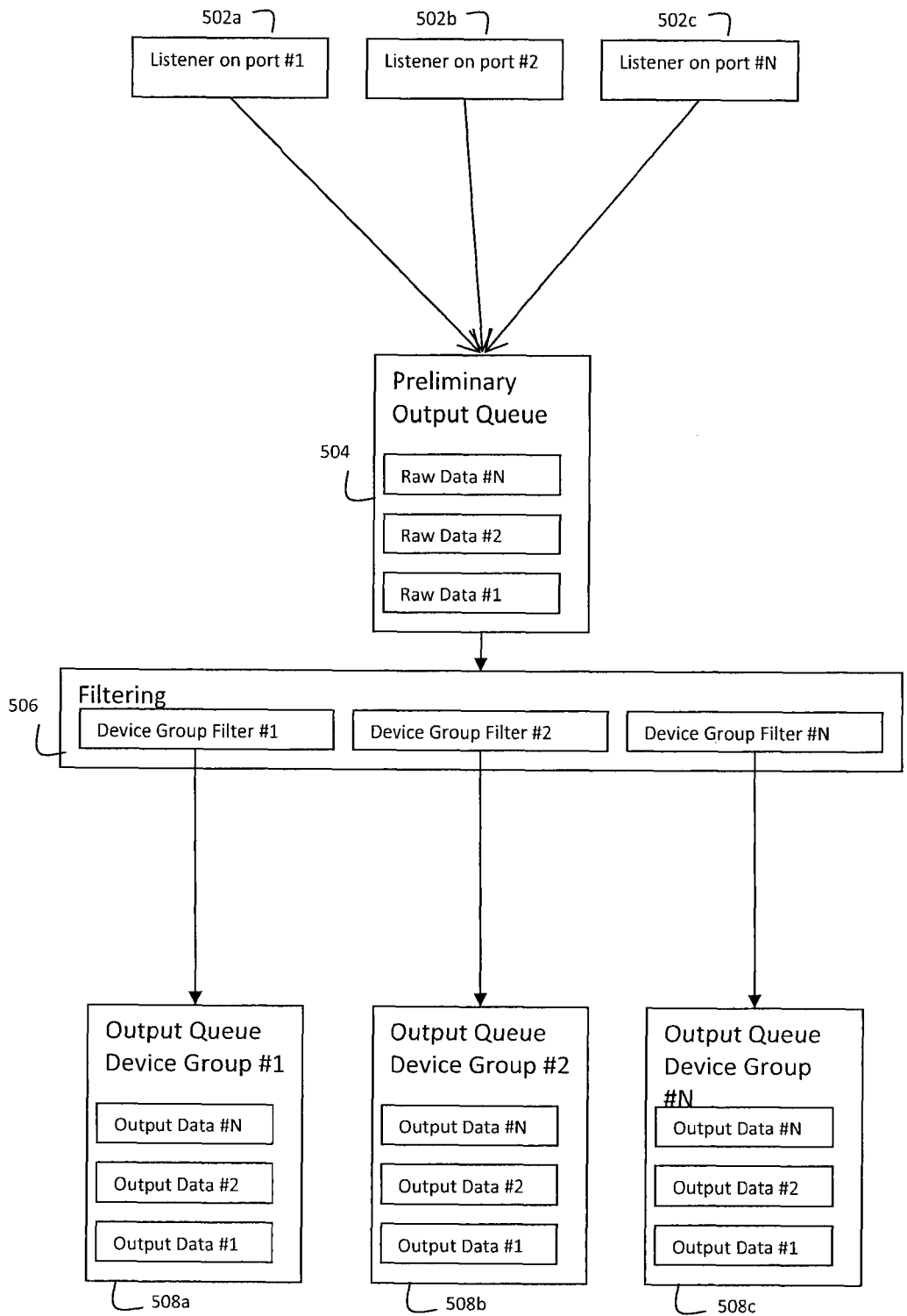
FIG. 4 illustrates a flow diagram for passive collection of data from sources, according to an embodiment of the invention.

Turning now to the actual method of data collection, FIG. 3 and FIG. 4 are used to illustrate at least two collection models. The agent engine process may receive data from the one or more devices (e.g., device group 26*a-c*) in one of several ways. The collector process may either proactively retrieve data from the network device(s) or passively listen for data from network device(s). Both provide device level visibility to a central manager 2.

In the proactive model 400, (see FIG. 3) the collector process may manage a device queue 402 of one or more connections to each respective network device (26*a-c*). The device queue 402 may cycle through each connection for each respective device through the connection thread pool 404. After one chunk of data is retrieved from a connection to a device (e.g., connection #1 to 26*a*), the connection is put back on an inactive queue in the device queue. The raw data may be placed in a preliminary output queue of raw data chunks for each respective connection. The raw data transformer pool 408 may transform (e.g., filter, normalize, etc.) the raw data from the respective connections at the device level and relatively early in the data stream. The process in operation 408 may filter the raw data to only include specific event data that the user is interested in. Furthermore, the raw data may be normalized to a common data structure specified by the over all system. This effectively enables a number of collectors which collect event data from disparate network devices to be able to report data in a common data structure which may be more easily processed and viewed by a network administrator.

Thus, the filtered and normalized event data may be put on an output queue 410 in the order it was taken off of the preliminary output queue 406 so that the order in which the data was initially received may be maintained. The output queue 410 can maintain the output data for each respective connection and send it to the agent engine process on request.

Depending on the connector, the connector may have one connection per device group and therefore one thread in the pool 404 processing the connection. In this case, the raw data transformer thread pool 408 would have one thread as well. Further, the preliminary output queue 406 and the raw data transformer thread pool 408 may be removed as they mat not provide further functionality in the case of a single thread.

FIG. 4 illustrates a second model 500 wherein one or more collectors passively listen for connections from data sources on respective local ports. This model describes a plurality collectors and device groups. The collectors can listen on one and/or two ports (e.g., TCP and UDP port). Data sources will connect via one of these ports. In order to direct a subset of the incoming messages to a particular collector, there may be a filter that describes what attributes incoming data should have in order to be sent to a particular collector. Part of the filter can be the IP of the source machine sending the data, which will limit the data sent to an agent to be from one source. However, the IP is optional in the filter, allowing the collector to be sent message from all sources.

FIG. 4 is a diagram of how passive model may operate. Connections from multiple data sources may be observed on one of several ports (502*a-c*). The raw data may be collected in a preliminary output queue (504) of raw data chunks by connection. The filtering process (506) may decide which device groups should get the message put on their queue based on their filter. As a result, the raw data is filtered by device group into output queues (508*a-c*) for the respective device groups. Other kinds of filtering besides device group level filtering are available. For example, filtering may be enabled at the connection level and/or the device level. When filtering at the connection level, some devices may have a filtering capability that is part of the protocol for getting data from the device. For example, a filter can specify the event data types to receive. When filtering at the device level, even if the connected device does not natively support filtering, the connection may be configured using a regular expression that will be executed against each record (the raw data) coming from the device. The filtered data can be sent to the agent engine on request.

Alternatively, or in addition to the passive and proactive collector models, another method may choose to implement a Java database (DB) connectivity collector. The DB connector can support a connection to a single database per device group. This implementation may prevent the agent engine 20 from having to track multiple databases and more than one type of query to multiple databases.

The DB connector receives input from the agent engine 20 in order to get data from the event source (e.g., device). This input is in the form of an SQL query. The SQL query can be passed to the DB connector from the agent engine 20 using the transmit (Tx) state. The Tx state will write out a value (the SQL Query), which can be forwarded to the DB connector. When the DB connector receives the SQL Query, it can execute the command and put the result of the query on an output buffer. As the agent engine loops over its' receive (Rx) state, the output from the query will be passed to the agent engine, a delimited chunk at a time. The DB connector can set a variable in the chunks of data indicating if the chunk is the last piece of data returned by the last executed SQL query. When the appropriate variable is set indicating the end of data from the last SQL Query, the agent engine may execute another Tx state to pass the next SQL query to the DB connector. In sum, the agent engine 20 starts, the Tx state writes out the query, the query is forwarded to DB connector (through the flow/slave mode/connection manager), the agent loops over its Rx state, receives output of SQL query one line at a time, and when there is no more data from the SQL Query, the agent can hit another Tx state to send the next SQL Query, which the DB connector can get and execute.

All or some collectors including active, passive and DB, report on their health also called status. Health statistics can be sent to a health viewer user interface 6 for display to a user. Each collector connection can have two points that can report health independently. They are the data ingress point and the data egress point.

In the data ingress point the health will be reported at the point that the collector connection gets data from the data source. For example, this may include the status of how much data is being received from a single connection or if the connection is connected or not. There can be 1 to n number of data ingress points per collector connection. The number of data ingress points does not necessarily equal the number of data egress points. The kind of health information that can be collected at the data ingress point depends on the type of collector connection used. The units of the data coming in can be either bytes or records depending on whether the collector knows how to break up the incoming data at the ingress point into records. If it does not, then the units may be bytes. There may be at least three types of connections for which data ingress health information is reported. They may be connection oriented server, connectionless server, and/or client connections.

Connection oriented network devices connections may include, for example, Syslog TCP and HTTPS. Health information reported in this context may be based on individual connections from remote data sources to the collector. Health information from the collector connection may include status, status over time, and/or identifier information. Status information may include whether the collector connection is successfully bound to a listening port and/or whether the collector connection is connected to a device. If not connected an error state may be displayed. Eventually, if still not connected, then the health information may be removed. Status over time may include, total data (bytes/records) received, total time connected, interval data (bytes/records) received, interval time, and/or time of last data received. Identifiers may include local host/port identifier and sender's host/port identifier.

Connectionless device connections may include Syslog UDP and SNMP. Health information reported in this context is based on each unique sender's IP address. The health report keeps track of the sender IP addresses that are observed. This is because there is no connection session to tie the health to. Similar to the health reports for a connection oriented server, the health information for a connection less server may include status, status over time and/or identifier.

The third type of collector connection for which data ingress health information may be reported is in client connections. Health information reported in this context may be based on connection to each device (which could be a log file, process, or socket). Health information may include status, status over time, and/or identifier information. Status may include connection status to source. Status over time may include total data (bytes/records) received, total time connected, interval data (bytes/records) received, interval time, time of last data received, and/or time of last data requested. Identifier information may be the name given by user to the client connection and/or connector specified identifier for what is connected to (e.g., filename, process command line, host/port, etc.).

The second point in the collector connector that may be monitored for health information is the data egress point. Health may be reported at the point that the collector connection passes the data out to the agent engine. There may be one data egress point for each device group. The number of data egress points will also equal the number of collector 22 processes. Health information reported at the data egress point may be that of the device group. The health information collected at this point may include status, status over time, and/or identifier. Status over time may include number of records in queue, total number of records sent out from the device group, total time that this device group was active (equals total agent engine running time), number of records sent out from this device group in last interval and/or the time of last interval. Identifier may include agent (port) name, proxy name, and in the case of server type connectors, this may be the name given by user to the filter that is associated with this egress point.

There may be at least two scenarios when health can be reported. The collector manager 14 or other entity may periodically poll the collectors for health status information. This may be synchronous health reporting. In another scenario the connector can asynchronously report error status to the collector manager 14 or other entity, immediately when the error occurs.

User Interfaces:

The system of the invention provides graphical interface capability which enables the user to configure collectors, monitor event sources, and/or manage collectors, among other things. The system may provide at least a health view interface 6, configuration interface 8, and/or collector repository interface 10. The health view interface 6 may, among other things, display one or more application windows that provide the status of objects in the current configuration. The configuration interface 8 may, among other things, display one or more windows for viewing and editing current configurations for collectors, event sources, filters, and/or testing. The central repository interface 10 may, among other things, display running collector repositories and collector details, and enable collector importing. One or more of the interfaces may be combined into one or more window displays.

Figure 5A:
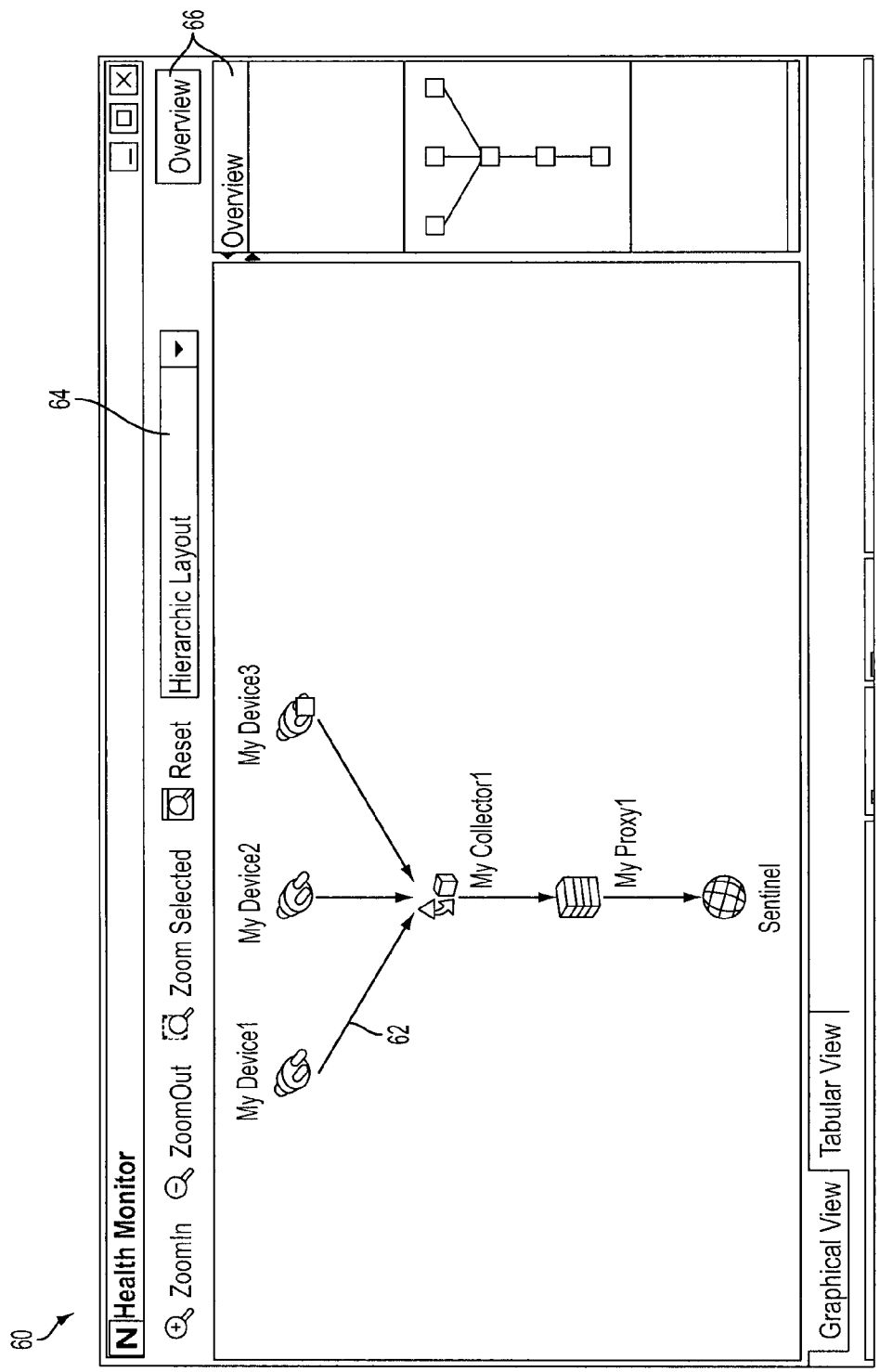
FIG. 5a illustrates a health monitor user interface using a graphical view, according to one embodiment of the invention.

Health View Interface:

The health view interface 6 can display the current status of entities in the system including the proxy manager 12, collector manager 14, collector 22, device group and/or individual device(s) (26a-c). The entities may be displayed as nodes in a hierarchical graphical format, with the nodes connected by arrows (or other visual means) indicating the direction of the flow of data. The icons used for each node can symbolically represent the type of entity the node represents. The icon of the node can change depending on the state of the entity the node is representing (e.g., running/stopped). FIG. 5a provides an example representation of the health view interface 6 in the graphical format. Optionally, the health view may be displayed in a tabular format as shown in FIG. 5b. Both formats provide device level visibility for status and connection information.

The tabular view 70 provides at least two status views. They are configured status 72 and actual status 74. The configured status may be the on/off state for which the node is configured to be in. The actual status 74 of the node may be reported by the actual running collector manager. The connection information column 76 may provide a textual description of the event source connection. The error column 78 may be a textual description of an error that occurred in the running node.

In the graphical view shown FIG. 5a, the graph arrows (or other indicator) not only show how the nodes relate to each other, but also the state of the data flowing between the entities. The color or texture of the arrow can show whether the connection is alive or dead (e.g., is an event source turned on such that it could possible send data to a collector). A tag on the arrow (not shown in the figure) can display the current records per second flowing from one node to another. The graphical view may also display a tool tip when a mouse (or other selecting device) "hovers" over a node. The tool tip can display a snapshot of more detailed status information. The graphical view also provides the option for selecting from various graphical layouts from a pull down menu 64 or other selection means. The overview portion 66 of the graphical view allows the user to quickly move across the graphical view. This is particularly useful when there are many entities in the screen and the user is zoomed in such that all of the entities are not viewable at the same time.

In the graphical view each node can have a number of right-click actions that can be taken on the node. It should be understood that other selection means besides right clicking may be used to result in the same actions. The right-click actions available when clicking on a node can be context sensitive to the type of node being clicked on. For example the right-click actions that may be supported for a proxy manager 12 may include proxy status details, configure proxy (opens the configuration dialog for the selected proxy), proxy events (opens an active view that displays events coming from the selected proxy), start proxy, stop proxy, and/or add collector (opens an "Add Collector" screen that can guide the user through the process of adding a collector to the selected proxy).

Right click actions and/or options associated with the collector 22 may include collector status details, collector data tap, collector configuration, collector events, add event source, start collector, and/or stop collector. The collector data tap can open a window that shows the user the live stream of raw data that is currently coming from the event source or flowing through the selected collector. The raw data may be viewed as filtered and/or normalized according to the collector functions. The collector configuration option can open a configuration dialog for the selected collector. Aspects of collector configuration are described in further detail below. The collector event option opens an active view that displays events coming from the selected collector. The add event source option can open a window that guides the user through the process of adding an event source to the selected collector.

Right click actions and options associated with a network device may include device status details, device data tap, device configuration, device events, start device, stop device and/or created correlation rule for device. The device data tap option can open a window that will display raw data (data not processed by the collector script) coming from the data source the device is connected to. The device configuration option opens a configuration dialog for the selected device. The device events option can open an active view that displays only events coming from the selected device.

Other actions and options that may be associated with both the collectors and devices may include among other things, remove, open raw data tap, move, and/or clone. The remove option can delete a selected event source and/or collector from the system. The open raw data tap opens a window that shows the user the live stream of raw data that is currently coming from the event source or flowing through the selected collector. The move option allows the user to move the selected entity from its current parent entity to another parent entity.

For example, in the case of event source, it allows the user to move the selected event source off of the collector that it is currently connected to and onto another collector. The clone option allows the user to create a new entity that has its configuration information pre-populated with the settings of the currently selected entity. For example, in the case of event source, it allows the user to create a new event source that is pre-populated with the configuration setting of the currently selected event source. This allows a user to quickly create a large number of similar event sources without having to retype in the same information over and over again.

Actions that may be common to all entities may include status details, configure, open active view, start, stop, tabular/graphical view, and/or zoom. Status details can display all information known about the status of the selected node. Status information is the runtime status of the node (e.g., On/Off, EPS, errors, etc.). A status details dialog displays status details of the selected node as well as all parent nodes (for quick viewing, since the status of parent objects may affect child node).

The configure option allows the user to edit the configuration information of an entity. The open active view option opens a full featured active view window that displays events that have been generated by data from or flowing through the selected entity. The start option sets the entity to be running by setting its state to ON.

The stop option sets the entity to be stopped by setting it's configured ON state to be false. The "show in tabular/graphical view" option switches to the other view (to tabular view if on graphical view, or to graphical view if on tabular view) and automatically selects the entity that is selected in the current view. When switching to graphical view, it also zooms in on the selected entity. The zoom option (in Graphical View) can be used to zoom in on a selected object in the graphical view display.

The health view interface described above may be used in an online health mode. In addition to the "online" mode there is also a design mode. The design mode may be represented as panel within the health view interface. This panel may allow the user to configure collectors and event sources (devices) without actually tying them to an instance of a real collector manager. This enables the user to view and edit nodes in the design mode while displaying no status information about these nodes because they are not actually tied to a collector manager. After getting the configuration of the collector and event source nodes just as desired in the design mode, the user can "deploy" the configuration to the collector manager, which can move the collector and event source nodes from the design mode to the online mode.

Configuration Interface:

The health viewer interface 6 can provide access to configuration interfaces 8 for selected nodes. The configuration interface 8 allows a user to edit and view current configurations. Similar to the health view interface 6, the configuration interface 8 may display windows in either a tabular and/or graphical view. The configuration interface 8 allows the user to configure various aspects of the system including adding collectors, adding event sources (e.g., device and/or device group(s)), raw data filtering, and/or device testing.

Figure 6A:
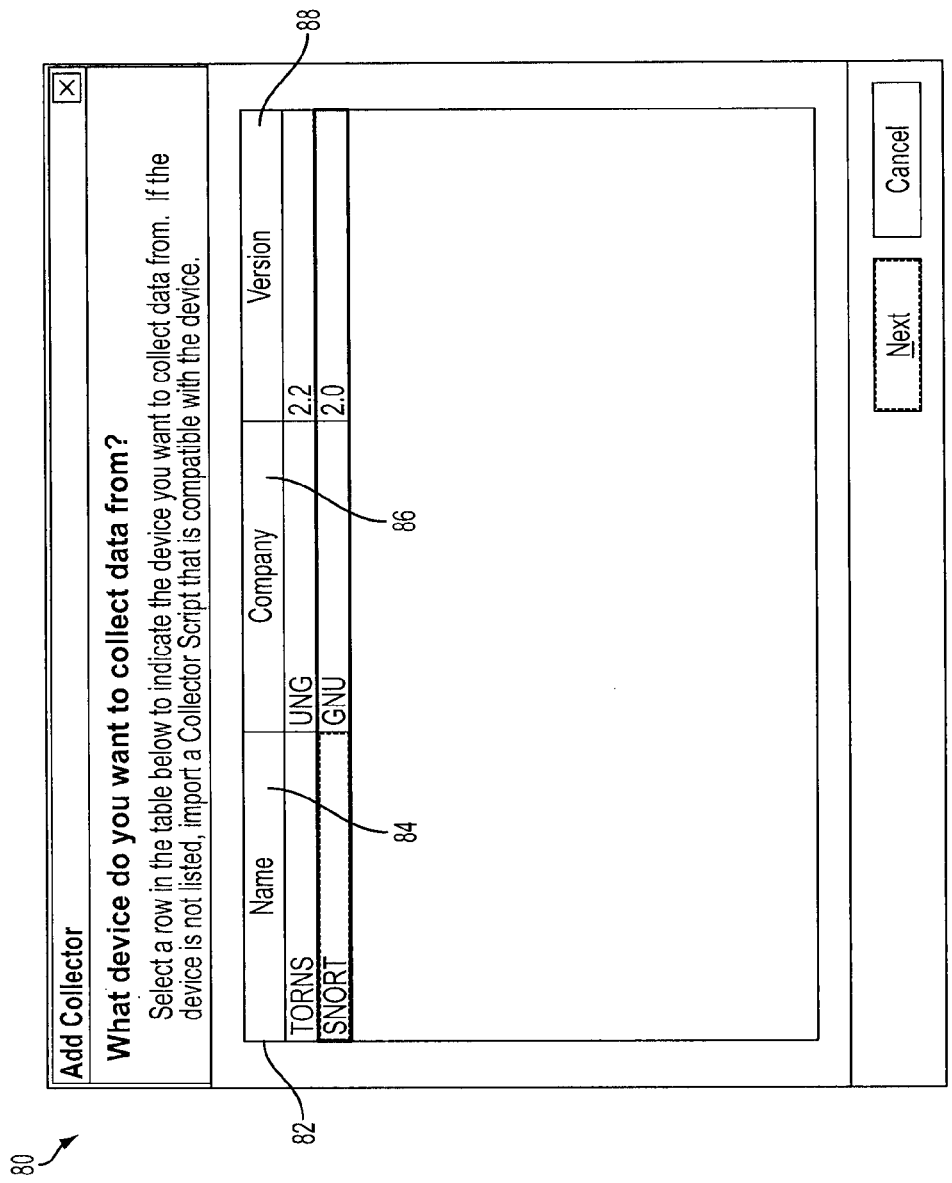
FIGS. 6a-6c illustrate a series of exemplary dialog windows for adding and/or configuring a collector, according to one embodiment of the invention.
Figure 6B:
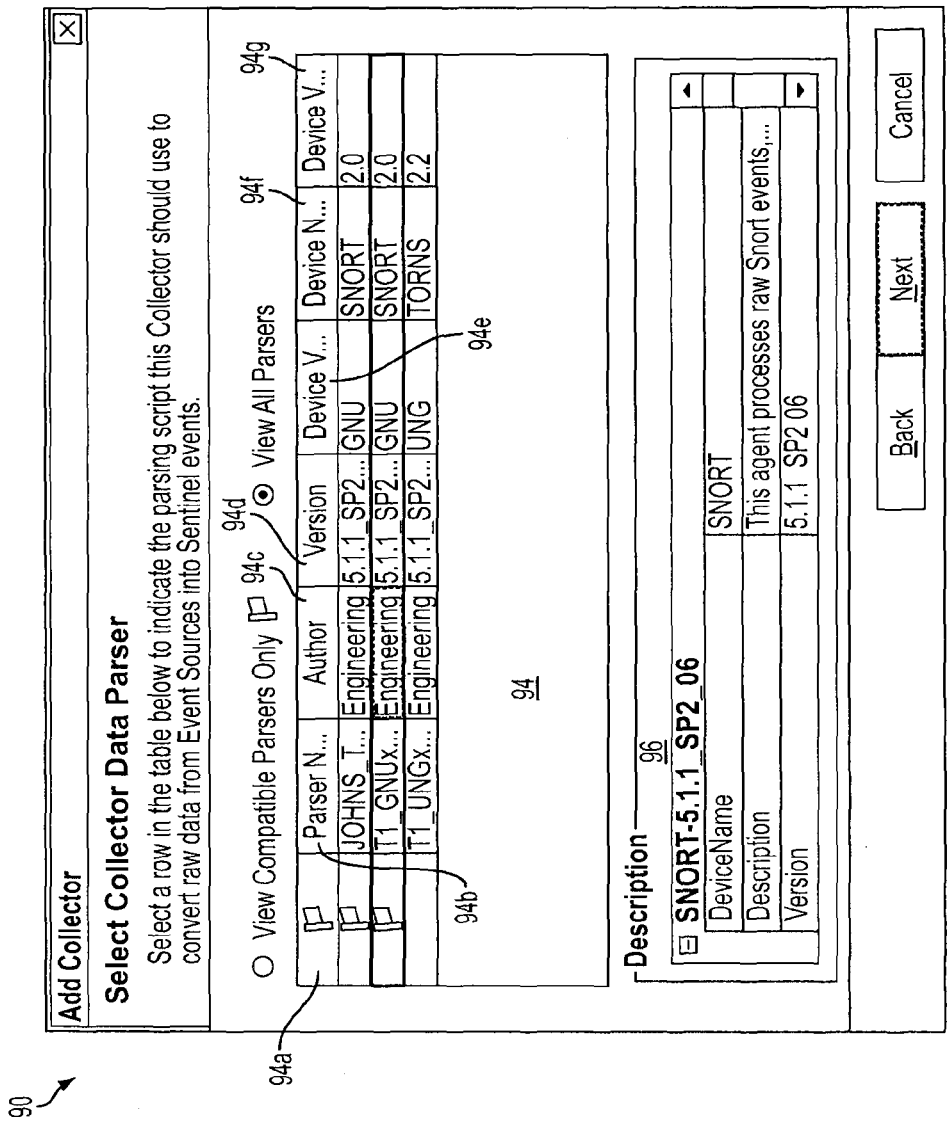
Figure 6C:
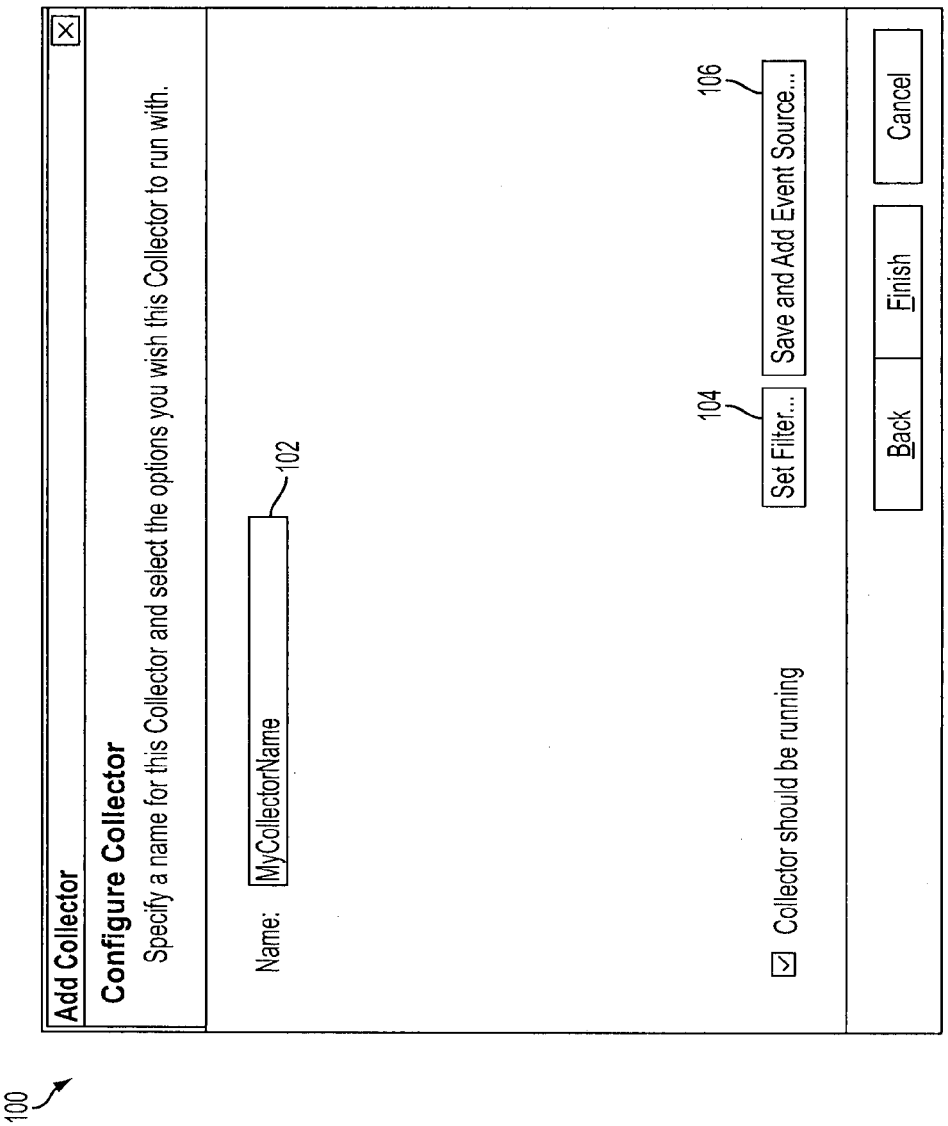

FIGS. 6a-6c illustrate a series of exemplary windows for adding and/or configuring a collector. In FIG. 6a the user can choose which device to gather data from. The list of devices 82 to choose from will depend on the set of collector scripts in the collector repository. Since collector scripts may be device specific, the user can choose to gather data from a device for which they have a collector that knows how to parse data from the device. This list 82 may appear as a table with three columns including vendor 84 (the name of the vendor that makes the device), product 86 (the product name of the device), and/or version 88 (the product version of the device).

If the user does not find the device they are looking for in the table but they do have the collector package (e.g., collector script) for the device they are looking for, there may be a button on this panel that launches the collector repository import interface to allow the user to import a new collector parser into the repository. The collector repository interface is discussed in further detail below. After the user is done with the collector repository import interface, they can be automatically returned to the add collector panel and the table in panel will have been updated to reflect the additional collector added to the list.

FIG. 6b illustrates an exemplary window 90 for selecting a collector script (parser). The chosen collector script may be used to process data from the device they selected in the first screen shown in FIG. 6a. The user may have the option to choose from a list of compatible collector scripts that specifically state in their meta-data that they can process data from the selected device. The user may also select via selection means 92 to view all available collector scripts. The list of collector scripts 94 to choose from can appear in a table with the columns below. When a user selects a collector script, the details from the meta-data from that collector script 96 can be displayed below the list of parsers. The list of collector scripts may be sorted by column including a column for compatibility 94*a*, parser name 94*b*, author 94*c*, version 94*d*, device vendor 94*e*, device name 94*f*, and device version 94*g*. The compatibility column 94*a* may be expressed using an icon indicative of compatibility. This column should have the compatibility icon in it when the collector script is known to be compatible with the device. The parser name column 94*b* stores the collector script name. The author column 94*c* indicates the organization (e.g., engineering) or individual who created the script. The version column 94*d* stores the version of the script (not the version of the device). The device vendor 94*e* shows the name of the vendor of the device that the script can process data from. The device name 94*f* shows the product name of the device that the script can process data from. The device version 94*g* is the product version of the device that the script can process data from. All columns should be sortable.

If the user does not find the script they are looking for in the table but they do have the collector package for the script they are looking for, a Collector Repository Import Wizard may be launched to allow the user to import a new Collector script into the repository. After the user is done with the Collector Repository Import Wizard, they will automatically returned to this window and the table in the window will have been updated to reflect the additional Collector Parser they've added to the repository.

FIG. 6*c* illustrates an exemplary window for configuring the added collector. The user can specify the name of the collector in text box 102, set the collector parameters, choose whether the collector should be running, and set the filter on the raw data flowing into the collector. Also, there may be a button 104 on this window that allows the user to save their changes to the collector and immediately jump to the "Add Event Source" wizard to begin adding Event Sources. Configuring an existing collector will look similar to the window shown in FIG. 6*c*.

Figure 7A:
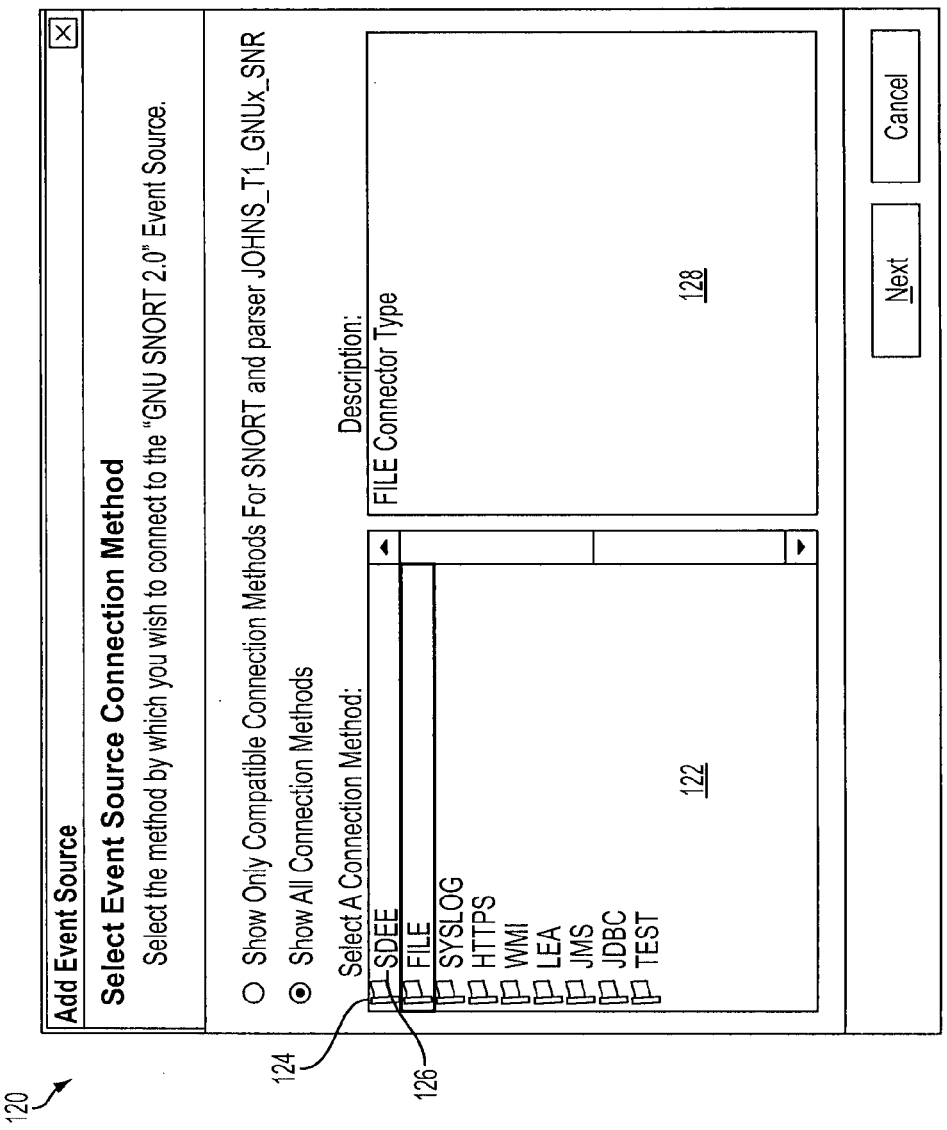
FIGS. 7a-7b illustrate exemplary windows for adding and/or configuring an event source, according to one embodiment of the invention.
Figure 7B:
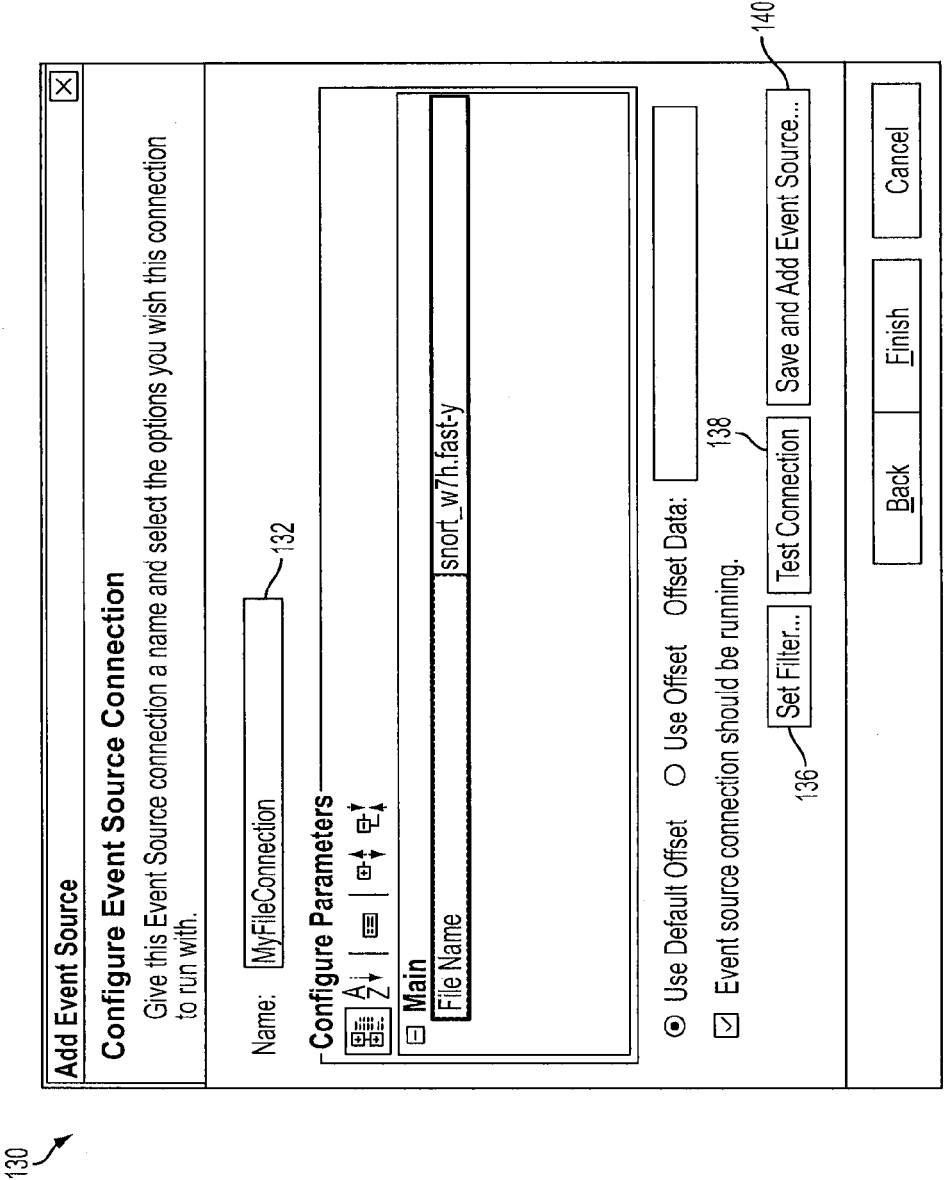

FIGS. 7*a* and 7*b* illustrate two windows that allow the user to add and/or configure an event source (e.g., device and/or device group(s)). In FIG. 7*a* the user may select a connection method. The user can select which connection method to use in order to get data from the device (the device was chosen when adding the collector). The list of connection methods to choose from may depend on the connections supported by the collector manager 14. The user can choose a connection method that is implemented by the collector manager 14. The user may have the option to choose from a list of compatible connection methods, that is, connection methods that are specifically stated in the associated collector meta-data as compatible with the collector or all connection methods. The list of connection methods to choose from can appear in a table with columns for compatibility 124 and/or name 126. Compatibility may be indicated by an icon when the connection method is known to be compatible with the associated collector. The name column contains the name of the connection method.

FIG. 7*b* illustrates a window 130 that may be used to configure the event source. The user can specify the name of the event source 132, set the connection method configuration properties, set the offset in the event source data 134, choose whether the event source should be running, set the filter on the raw data flowing through the event source 136, and test the connection 138. Also, there may be a button that allows the user to save changes 140 to the event source and immediately start adding another event source by jumping to the beginning of the "Add Event Source" windows. After clicking finish, if the user selected to have the event source running and the associated collector is also set to be running, the dialog should appear to tell the user if the event source and collector did indeed startup successfully. Configuring an existing event source may look similar to the window shown in FIG. 7*b*.

The configuration interface also allows the user to test the configuration of a device. This allows the user to establish with more certainty that the configuration parameters they entered into the configuration interface are correct. Within the device configuration dialog (FIG. 7*b*), there may be a selection means 138 that, when selected, will test the device configuration. Devices that have been already saved to the database as well as devices that have not been saved to the database can be testable. A user can edit the configuration of a device while the device is in the running state.

Furthermore, a user can test a device that is in the running state. The testing of the device can be done independently of the already running device, therefore the fact that the user is testing the device may not affect the data flowing into the running device. The device may be affected when the user saves the configuration change. When the test button is clicked, a new window may pop up. The new window may have display components including: a display for the values of the attributes of the Proxy Device Status object from the Device being tested; a display for the data from the Device (the data will stream from the Device to the GUI), and/or a stop button that the user can click to stop the testing of the Device. Closing the window may also implicitly stop the testing of the Device. Device testing may also include a way of testing the Device and Device Group filters.

Figure 8:
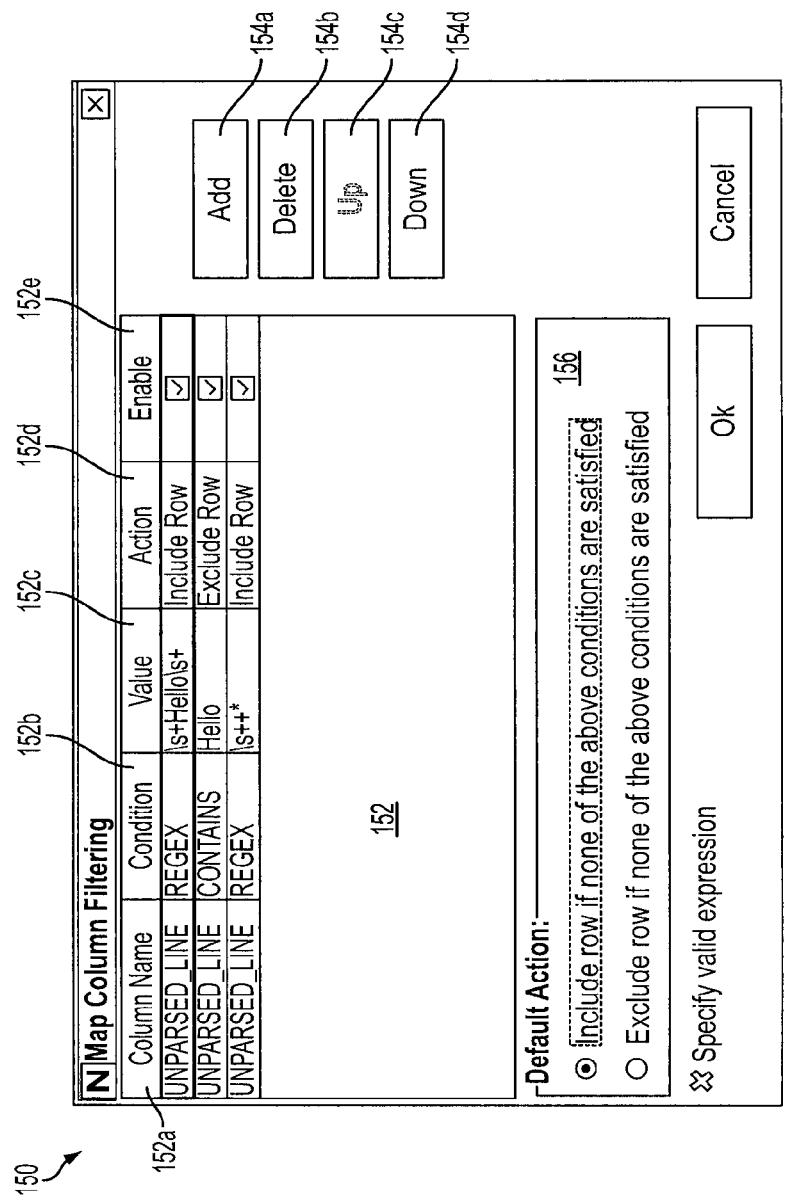
FIG. 8 illustrates an exemplary window for selecting filters, according to one embodiment of the invention.

The event source and collector may be further configured to filter the raw data collected there from. FIG. 8 illustrates a filtering window 150 with a table of filters 152. Each row (152*a-e*) in the table is a single criterion for matching against the incoming data. Together, all of the rows 152*a-e* make up the overall filter criteria. The filter criteria are matched from top down, with the first match being the one performed. Once the first matching criterion is found, the criteria under it are not checked. The filter manipulation buttons 154*a-d* enable the user to Add, Remove, and reorder the criteria in the table. The default action selection 156 allows the user to specify whether to include or exclude the data if the data does not match any of the criteria specified in the table.

The columns of the table may include column name 152*a*, condition 152*b*, value 152*c*, action 152*d*, and/or enable 152*e*. The incoming data may be a map of key-value pairs. The column name 152*a* is the name of the key whose corresponding value this row's criteria will be matched against. The condition column 152*b* allows the user to select the kind of criteria that will be used. Regular expressions may be supported. There may also be other kinds of criteria types typically available for Strings. The value column 152*c* may indicate the actual criteria to match against. This value will be used differently based on the condition selected. The "value" column can be automatically validated by the interface for acceptability. If there is an error in the value column (such as empty value or invalid regex) that cell of the table will be highlighted and a description of the error will be displayed in the lower left of the dialog. The column for action 152*d* specifies an action to be taken if there is a match. Actions may be "include" (which will result in data passing the filter) and "exclude" (which will result in the data being dropped by the filter). The enable column 152*e* allows the user to set a flag. If this flag is not checked, then the row will be skipped, just as if it was not part of the filter. This allows a user to easily disable part of a filter temporarily.

Collector Repository Interface:

The collector repository interface 10 enables users to update a collector in one location and have the change automatically propagate out to the collector manager that is controlling the collectors. There may be at least three collector repository screens that make up the interface functionality. They may include a collector repository viewer, collector details, and/or import collector wizard.

Figure 9:
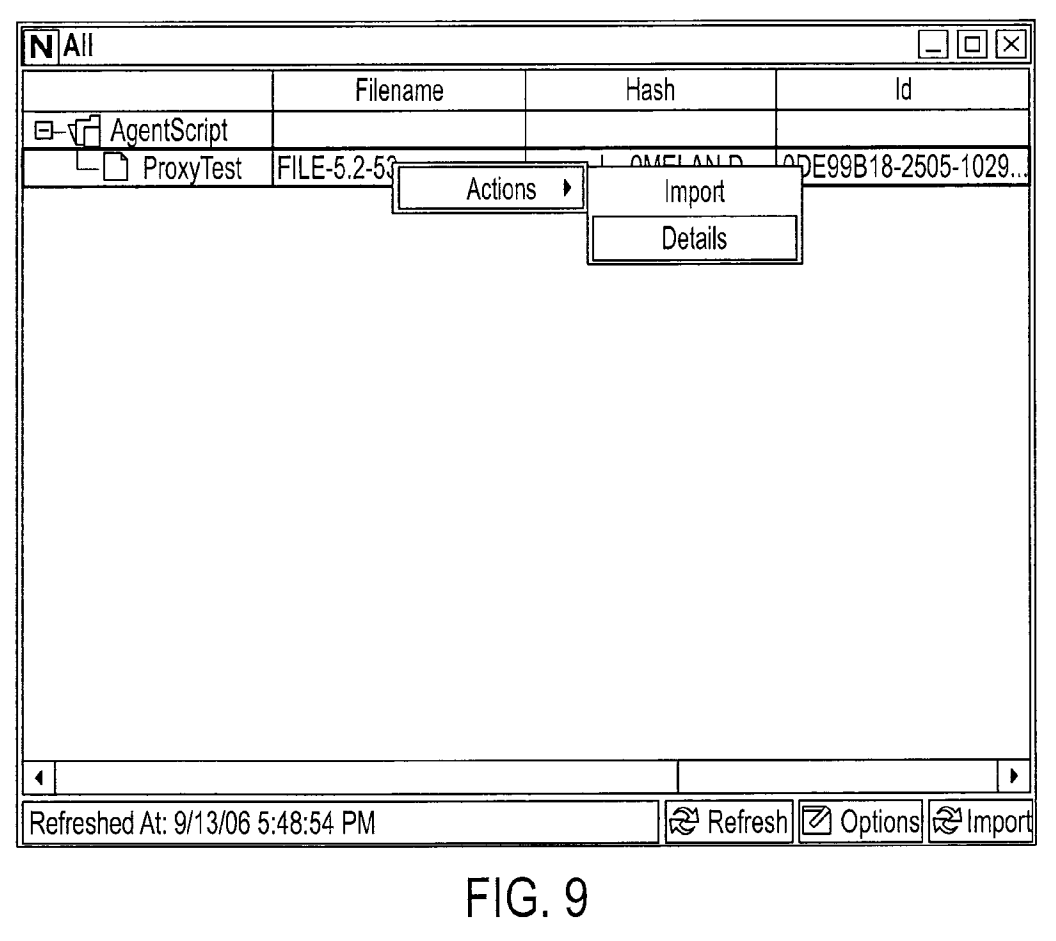
Figure 10:
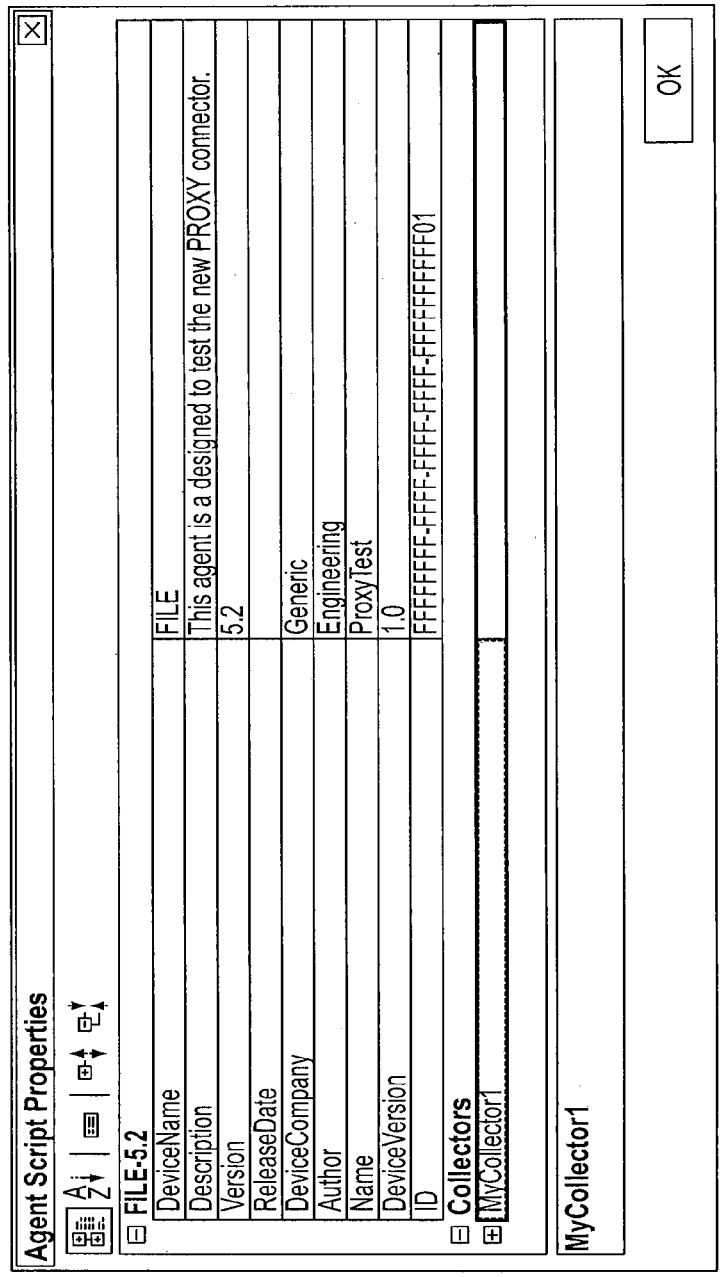
FIG. 10 illustrates an exemplary collector details window, according to one embodiment of the invention.

FIG. 9 illustrates an exemplary collector repository viewer. The functionality provided by this window allows the user to view the detailed information about the collector (by double clicking (or other action) on the collector from the list). FIG. 10 illustrates an exemplary collector details window which displays information from the collector's meta-data and instances of the collector currently deployed.

Figure 11:
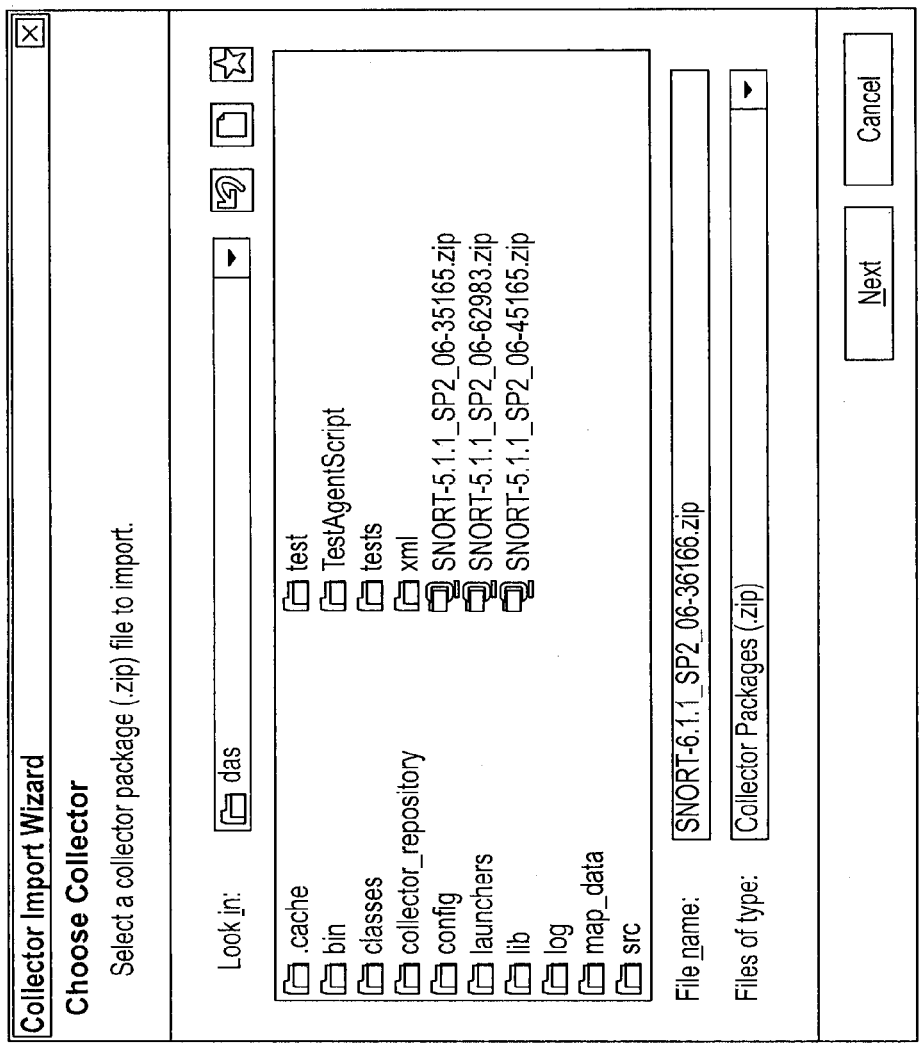
FIG. 11 illustrates an exemplary file chooser dialog, according to one embodiment of the invention.

The collector import wizard allows the user to import collector scripts. FIG. 11 illustrates a first screen in wizard that provides the user with a file chooser dialog for browsing stored collector packages. The file chooser may have a built-in filter to show files with the valid file extension for a collector package. Various outcomes may be performed based on the selected collector package. If the ID of the collector being imported does not match any of the collectors currently in the repository, then the meta-data of the collector being imported will be displayed and the user can finish and proceed to import the collector. They also have the option of clicking "Finish and Deploy", which will import the collector package and after importing is successful it will bring up the "Add Collector" wizard.

If the ID of the collector being imported does match one of the collectors currently in the repository, then the meta-data of the existing collector may be displayed as well as the meta-data of the new collector being imported. The user may be asked to confirm the replacement of the collector currently in the repository with the collector selected for import. In this case there will also be a selection means that allows the user to select whether to update at next restart or update immediately.

If update at restart is selected, the updates in the newly imported collector will not be pushed out to any deployed collectors until the next time the collector restarts (when collectors restart the collector Manager checks against the repository to make sure it has the latest version of the collector). If the update immediately option is selected this forces all currently deployed collectors to restart, causing them to immediately download from the collector repository the latest version of the collector being imported.

After the user confirms import of the collector script, the collector script will be uploaded to central repository. It may be saved to the server in a new filename. After being uploaded, an agent script data object for this collector script will either be created and saved to the DB (if this is a new collector script) or the existing agent script data object will be updated (if this is an update of the collector script). One of the attributes in the agent script data object will be the hash of the zip file of the new collector script.

When a collector Manager is starting a collector, it may first check that the hash of the collector script it has matches the hash of the collector script in the central repository. If they do not match, then the collector manager will download the collector script from the central repository, replacing the collector script it has locally. It will then run this collector script.

If replacing an existing script already being used, a window may pop up allowing the user to select which agent ports (port configs) they want to push this updated script out to. The list of agent ports displayed may be in two categories 1) agent ports running the same agent for the same version of the same device (e.g., the case of Engineering bug fix or enhancement) 2) agent ports running the same agent for a different version of the same device (e.g., the case when an agent is updated to support a newer version of the same device).

An agent status interface can display when an agent script is not in sync with the server (because the Agent has been running since before the script was updated in the central repository). If the agent script is updated in the repository, port configurations will automatically be updated (may require a port stop/start).

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g., semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A system for providing event source management, the system comprising:
   one or more physical processors programmed to execute one or more computer program instructions which, when executed, cause the one or more physical processors to:
   configure a collector associated with (i) a port configuration file having configuration information for opening one or more communication ports to one or more network devices, and (ii) a collector script;
   determine at least one network device to connect to the collector based on the collector script, wherein the collector is configured to open at least one communication port to the at least one network device based on the port configuration file, and to collect event data from the at least one network device via the at least one communication port; and
   receive, from the collector, the collected event data.

2. The system of claim 1, wherein the one or more physical processors are further caused to:
   provide, via one or more user interfaces, a presentation of the collected event data.

3. The system of claim 2, wherein the one or more physical processors are further caused to:
   receive, from the collector, status information associated with one or more of the collector or the at least one network device; and
   provide, via the one or more user interfaces, a presentation of the status information.

4. The system of claim 1, wherein the event data is associated with one or more of security events, compliance events, or network traffic events.

5. The system of claim 1, wherein the collector is configured to execute the collector script to parse the event data into a normalized data structure, and wherein receiving the collected event data comprises receiving the parsed event data from the collector.

6. The system of claim 5, wherein the collector comprises an ingress point to collect the event data from the at least one network device and an egress point through which the parsed event data is provided by the collector.

7. The system of claim 6, wherein the one or more physical processors are further caused to:
receive, from the collector, status information associated with the collector, and wherein the status information comprises health information associated with the ingress point and the egress point.

8. The system of claim 7, wherein the one or more physical processors are further caused to:
receive the health information from the collector via a proxy manager.

9. The system of claim 1, wherein the one or more network devices comprise one or more of a firewall device, a router device, a biometric device, a mainframe device, a database device, or an application-specific device.

10. The system of claim 1, wherein the one or more physical processors are further caused to:
receive, from the collector, status information associated with the at least one network device, wherein the status information comprises state information indicating whether the at least one network device is active or inactive; and
provide, via one or more user interfaces, a presentation of the current state.

11. The system of claim 1, wherein the one or more physical processors are further caused to:
receive, from the collector, status information associated with the collector and the at least one network device; and
provide, via one or more user interfaces, a presentation that indicates one or more relationships among the collector, the at least one network device, and a proxy manager and that indicates the status information.

12. The system of claim 1, wherein the one or more physical processors are further caused to:
receive, via one or more user interfaces, a user selection of the at least one network device, and wherein the configuration of the collector is based on the user selection of the at least one network device.

13. A computer-implemented method of providing event source management, the method being implemented on a computer system that includes one or more physical processors executing one or more computer program instructions which, when executed, perform the method, the method comprising:
configuring, by the one or more physical processors, a collector associated with (i) a port configuration file having configuration information for opening one or more communication ports to one or more network devices, and (ii) a collector script;
determining, by the one or more physical processors, at least one network device to connect to the collector based on the collector script, wherein the collector is configured to open at least one communication port to the at least one network device based on the port configuration file, and to collect event data from the at least one network device via the at least one communication port; and
receiving, by the one or more physical processors from the collector, the collected event data.

14. The method of claim 13, further comprising:
providing, by the one or more physical processors via one or more user interfaces, a presentation of the collected event data.

15. The method of claim 14, further comprising:
receiving, by the one or more physical processors from the collector, status information associated with one or more of the collector or the at least one network device; and
providing, by the one or more physical processors via the one or more user interfaces, a presentation of the status information.

16. The method of claim 13, wherein the event data is associated with one or more of security events, compliance events, or network traffic events.

17. A computer-implemented method of providing event source management, the method being implemented on a computer system that includes one or more physical processors executing one or more computer program instructions which, when executed, perform the method, the method comprising:
associating, by the one or more physical processors, a port configuration file with a collector, wherein the port configuration file includes configuration information for opening one or more communication ports to one or more network devices;
initiating, by the one or more physical processors, a connection of the collector to at least one network device based on the port configuration file and a collector script, wherein the collector is configured to open at least one communication port to the at least one network device, and to collect event data from the at least one network device via the at least one communication port; and
receiving, by the one or more physical processors, the event data from the collector.

18. The method of claim 17, further comprising:
receiving, by the one or more physical processors from the collector, status information associated with the at least one network device; and
providing, by the one or more physical processors via one or more user interfaces, a presentation of the status information.

19. The method of claim 17, wherein the collector comprises an ingress point through which the event data is collected by the collector from the at least one network device and an egress point through which the event data is received from the collector, and wherein the status information comprises health information associated with the ingress or egress points.

20. The method of claim 17, wherein the event data is associated with one or more of security events, compliance events, or network traffic events.

* * * * *